(12) United States Patent
LaFave

(10) Patent No.: US 9,333,822 B1
(45) Date of Patent: May 10, 2016

(54) TRAILER HITCH ATTACHMENT SYSTEM WITH MULTIPLE RECEIVERS

(71) Applicant: Neil A. LaFave, Cody, WY (US)

(72) Inventor: Neil A. LaFave, Cody, WY (US)

(73) Assignee: Loumar Stackable Hitches, LLC, Cody, WY (US)

( * ) Notice: Subject to any disclaimer, the term of this patent is extended or adjusted under 35 U.S.C. 154(b) by 0 days.

(21) Appl. No.: 14/611,187

(22) Filed: Jan. 31, 2015

(51) Int. Cl.
*B60R 9/06* (2006.01)
*B60D 1/58* (2006.01)

(52) U.S. Cl.
CPC .... *B60D 1/58* (2013.01); *B60R 9/06* (2013.01)

(58) Field of Classification Search
CPC .......................................................... B60R 9/06
USPC ........... 224/519, 531, 532; D12/162; 280/504
See application file for complete search history.

(56) References Cited

U.S. PATENT DOCUMENTS

| 4,648,617 | A | * | 3/1987 | Hannappel | B62D 63/065 |
| | | | | | 280/304.3 |
| 5,096,102 | A | * | 3/1992 | Tolson | B60R 9/06 |
| | | | | | 224/501 |
| 5,511,813 | A | | 4/1996 | Kravitz | |
| 5,649,656 | A | * | 7/1997 | Davy | B60P 3/1025 |
| | | | | | 224/405 |
| 5,820,004 | A | * | 10/1998 | Lane | B60R 9/06 |
| | | | | | 224/485 |
| 5,938,092 | A | * | 8/1999 | Johnson | B60R 9/06 |
| | | | | | 224/405 |
| 6,089,431 | A | * | 7/2000 | Heyworth | B60D 1/075 |
| | | | | | 224/521 |
| 6,126,053 | A | * | 10/2000 | Shaver | B60R 9/06 |
| | | | | | 211/195 |
| 6,129,371 | A | * | 10/2000 | Powell | B60R 9/06 |
| | | | | | 224/502 |
| 6,237,824 | B1 | * | 5/2001 | Bagley | B60R 9/06 |
| | | | | | 224/402 |
| 6,460,745 | B1 | | 10/2002 | Weaver | |
| 6,511,088 | B2 | * | 1/2003 | Kahlstorf | B60D 1/075 |
| | | | | | 224/521 |
| 6,517,134 | B2 | * | 2/2003 | Armstrong | B60P 3/40 |
| | | | | | 224/405 |
| 6,524,054 | B2 | * | 2/2003 | Maney | B60R 9/06 |
| | | | | | 224/519 |
| 6,662,983 | B2 | * | 12/2003 | Lane | B60R 9/06 |
| | | | | | 108/44 |
| 6,695,184 | B2 | | 2/2004 | Higginbotham, III | |
| 6,874,804 | B2 | * | 4/2005 | Reese | B60D 1/06 |
| | | | | | 224/520 |
| 6,994,362 | B2 | * | 2/2006 | Foster | B60R 9/06 |
| | | | | | 280/163 |
| 7,419,076 | B1 | * | 9/2008 | Grothues | B60R 9/08 |
| | | | | | 114/343 |
| 7,559,570 | B2 | * | 7/2009 | Cearns | B60D 1/52 |
| | | | | | 280/490.1 |
| 7,997,606 | B1 | * | 8/2011 | Sandelius | B60P 3/077 |
| | | | | | 280/402 |

(Continued)

*Primary Examiner* — Justin Larson
(74) *Attorney, Agent, or Firm* — Antoinette M. Tease

(57) ABSTRACT

A four-part trailer hitch attachment system comprising a bottom component, a four-leg intermediate component, a three-leg intermediate component, and a top component. The bottom component comprises a horizontal leg oriented parallel to the long axis of the vehicle and a vertical leg that is welded to a top side of the horizontal leg. The four-leg intermediate component comprises a first vertical leg, a transversely oriented horizontal leg, a longitudinally oriented horizontal leg, and a second vertical leg. The three-leg intermediate component comprises a first vertical leg, a horizontal leg, and a second vertical leg. The top component comprises a horizontal leg and a vertical leg.

3 Claims, 11 Drawing Sheets

(56) References Cited

U.S. PATENT DOCUMENTS

| | | | |
|---|---|---|---|
| 8,366,373 B2 | 2/2013 | Wood | |
| 8,657,167 B2* | 2/2014 | Horyna | F41J 9/20 |
| | | | 224/282 |
| 8,840,000 B1* | 9/2014 | Simpson | B62D 43/02 |
| | | | 224/42.21 |
| 9,175,497 B1* | 11/2015 | Poudrier | E04H 15/32 |
| 9,216,698 B2* | 12/2015 | Rhodes | B60R 9/065 |
| 2003/0164390 A1 | 9/2003 | Higginbotham, III | |
| 2003/0168487 A1 | 9/2003 | Lane et al. | |
| 2004/0020955 A1 | 2/2004 | Darby | |
| 2004/0232185 A1* | 11/2004 | Darby | B60R 9/06 |
| | | | 224/521 |
| 2006/0133916 A1 | 6/2006 | Wood | |
| 2007/0108246 A1* | 5/2007 | Jennings | B60R 9/06 |
| | | | 224/521 |
| 2008/0122199 A1 | 5/2008 | Cearns | |
| 2010/0294819 A1* | 11/2010 | Spera | B60R 9/06 |
| | | | 224/519 |
| 2012/0168480 A1* | 7/2012 | Gray | B60P 3/10 |
| | | | 224/519 |
| 2013/0264367 A1* | 10/2013 | Hill | B60R 9/06 |
| | | | 224/413 |

\* cited by examiner

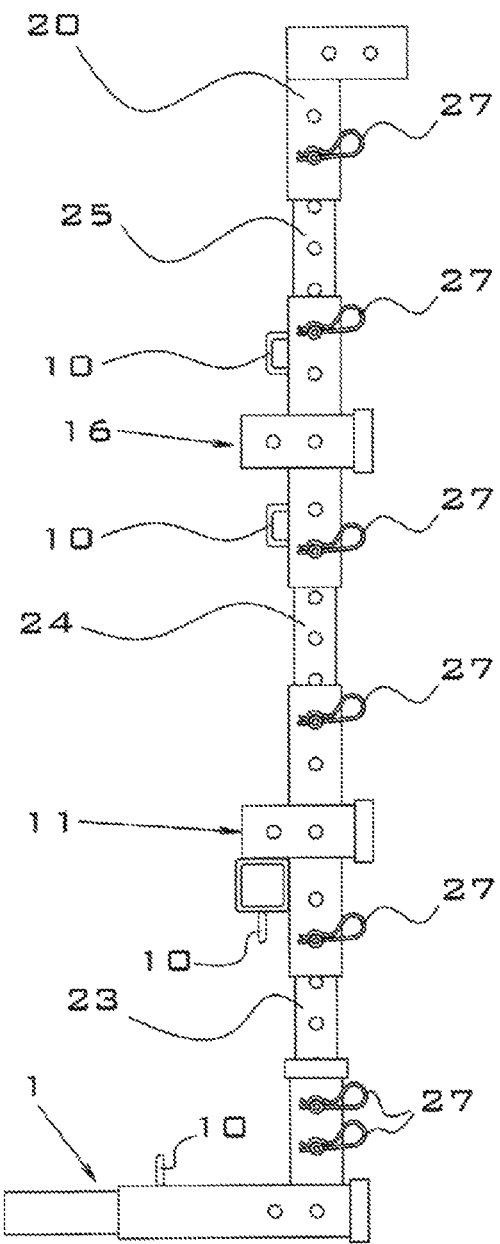
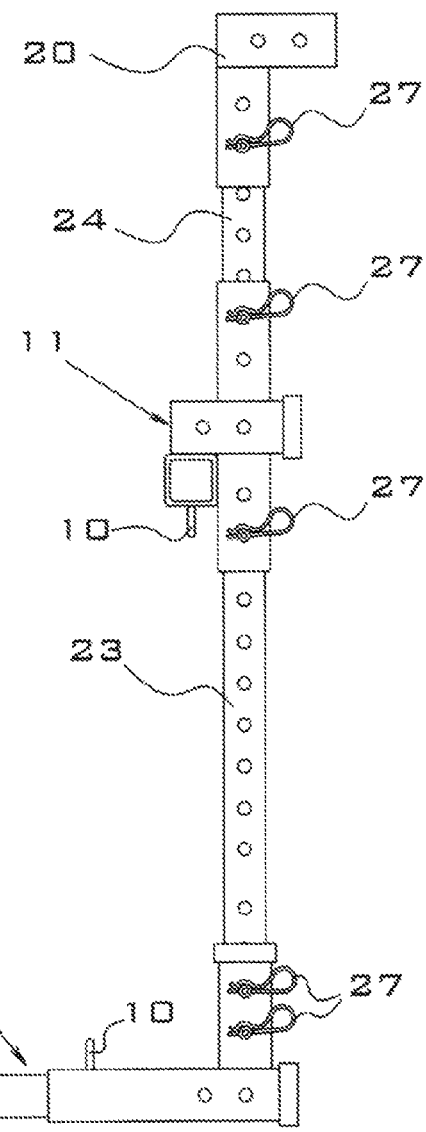

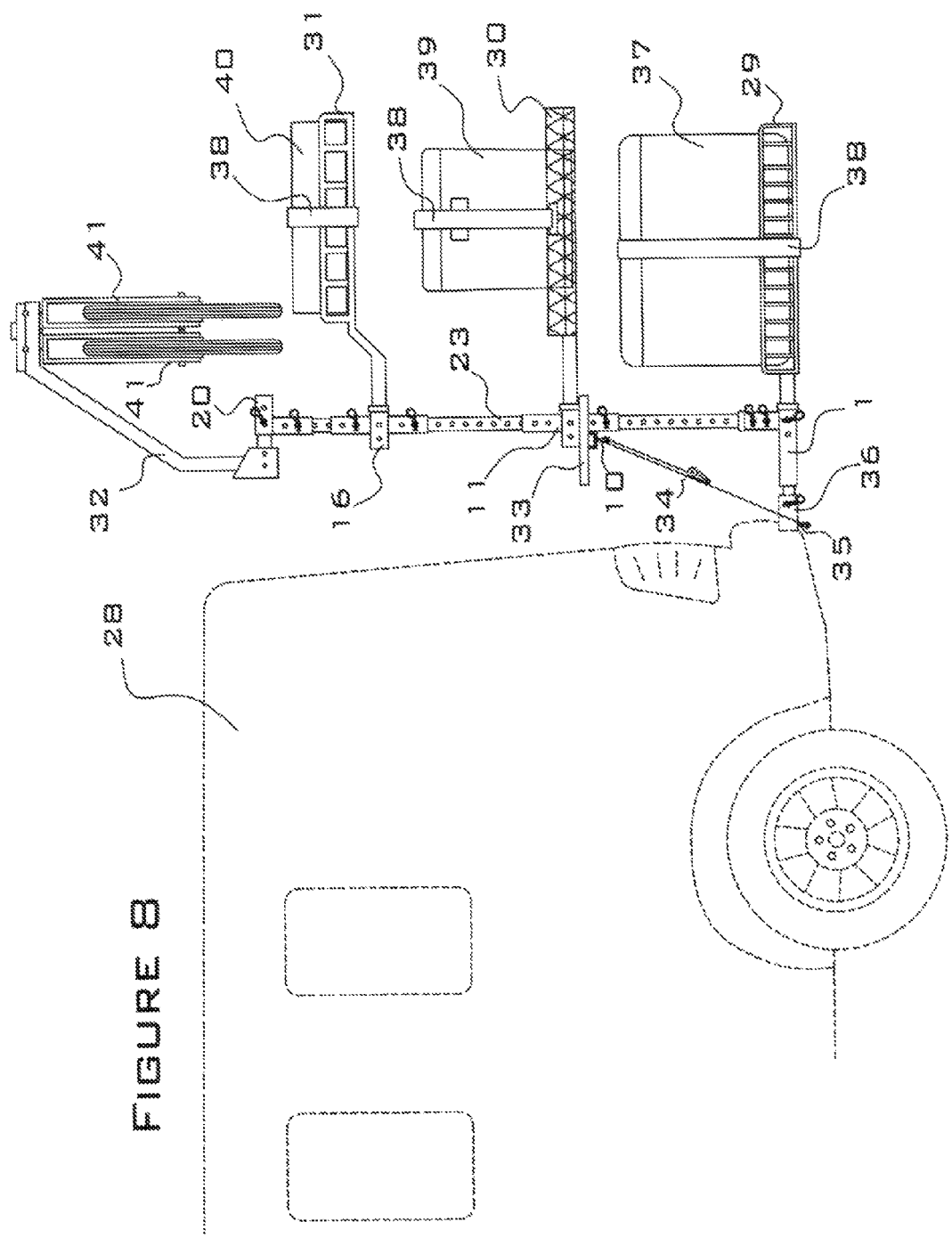

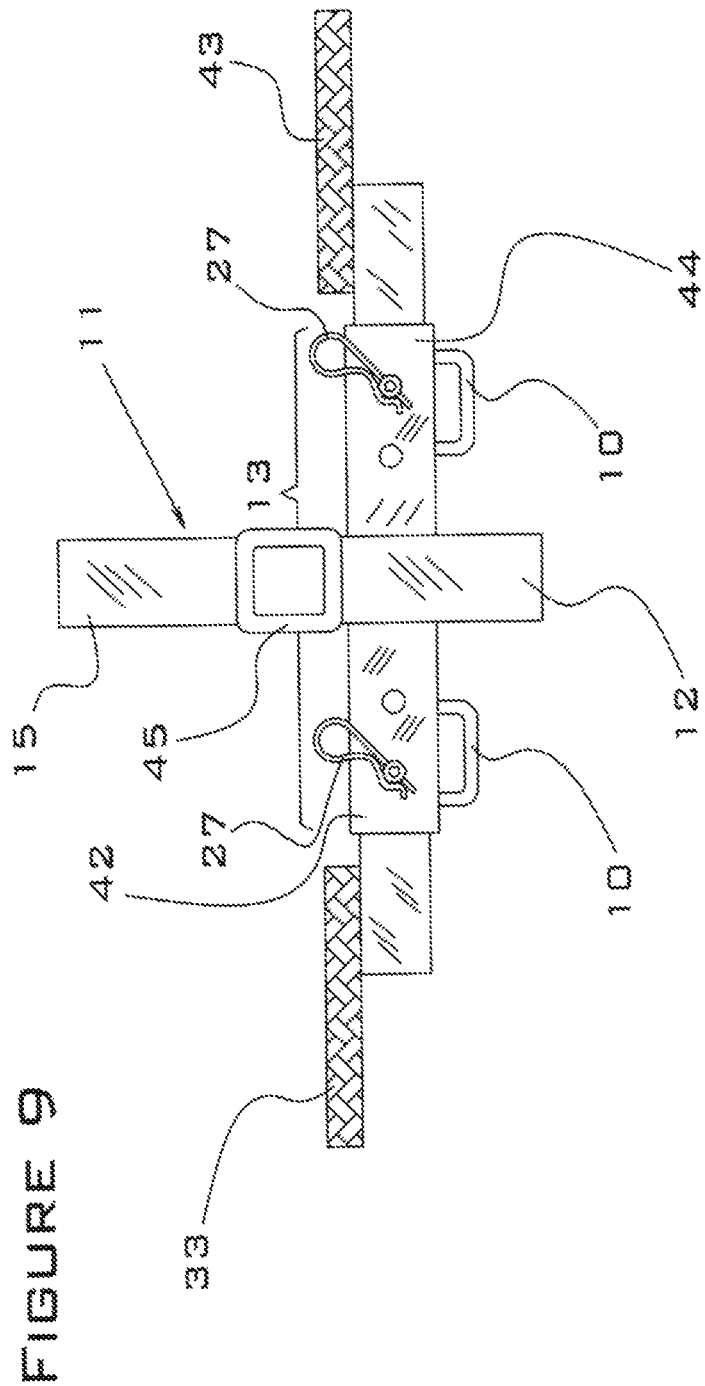

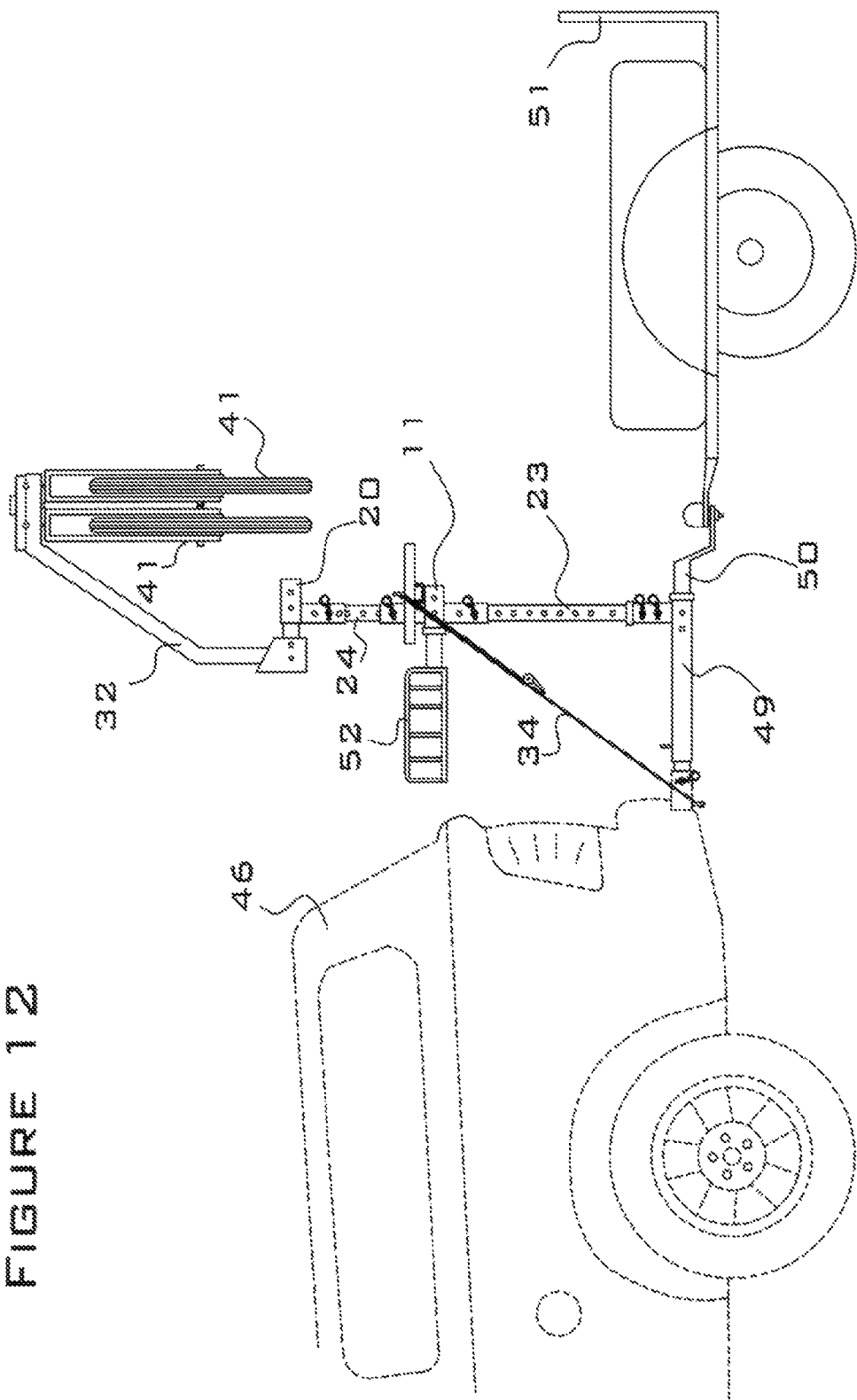

TRAILER HITCH ATTACHMENT SYSTEM WITH MULTIPLE RECEIVERS

BACKGROUND OF THE INVENTION

1. Field of the Invention

The present invention relates to the field of trailer hitch attachments, and more particularly, to a trailer hitch attachment system with multiple receivers that may be assembled in a variety of configurations and that may accept a wide variety of hitch-mountable devices.

2. Description of the Related Art

A need exists to be able to transport items on the exterior of vehicles, and numerous products are available that provide storage devices (such as cargo carriers and bicycle racks) that may be removably attached to a vehicle's trailer hitch receiver. These products are commonly used to transport bulky or dirty items, such as folding tables and chairs, barbeque grills, portable generators, firewood and other items that are used for camping, hunting, field work, etc. In many cases, it would be advantageous to carry more items than are currently practical to carry with existing carrier products.

The present invention presents a solution to the problem of insufficient carrying capacity by providing multiple trailer hitch receivers that may be connected together at variable spacings and configurations so that multiple carriers may be installed on a vehicle simultaneously. For example, the present invention may used to simultaneously support a firewood carrier, a food cooler carrier, a camping gear carrier and a bicycle rack. Although there are numerous carrier products that are the subject of existing patents or patent applications, and also numerous unpatented products on the market, none of these devices is similar to the present invention in terms of structure or function.

U.S. Pat. No. 5,511,831 (Kravitz, 1996) discloses an adjustable-width trailer hitch assembly that may be attached to the frame of a wide variety of vehicles. This invention comprises an adjustable-width frame mounting assembly and a single hitch receiver. The invention does not provide for multiple receivers.

U.S. Pat. No. 6,460,745 (Weaver, 2002) discloses a trailer-hitch mounted bicycle rack that provides for a bicycle to be carried with the frame of the bicycle oriented parallel to the long axis of the vehicle. The invention also provides a swivel mechanism so that the bicycle may be temporarily rotated downward to open the trunk of a vehicle. The invention does not provide for multiple receivers.

U.S. Pat. No. 6,662,983 (Lane et al., 2003) discloses a trailer-hitch mounted rack system that is described as "multi-configuration, multi-purpose." The invention comprises extension legs, a crossbar with extension arms and a folding cargo platform. The various components of the system may be assembled in a variety of configurations to optimize the system for carrying a particular type of cargo; for example, one assembly configuration may be used for carrying a bicycle and another assembly configuration for carrying sheets of building material. The screw-type connectors of the invention are claimed to eliminate wobble between the connected parts. There is no provision in the invention for attaching multiple receivers or for attaching additional trailer hitch-compatible accessories.

U.S. Pat. No. 6,695,184 (Higginbotham III, 2004) discloses a trailer hitch-mounted bicycle carrier that carries a single bicycle vehicle in a transverse orientation. The invention comprises a mechanism that pushes downward on the seat of the bicycle, compressing the shock-absorber spring of the bicycle and thereby holding the bicycle firmly in place within the carrier with spring force. There is no provision for multiple receivers or for attaching other trailer hitch-compatible accessories.

U.S. Pat. No. 7,559,570 (Cearns, 2009) discloses a trailer hitch assembly with a vertically adjustable hitch ball. There is no provision for multiple receivers or for attaching other trailer-hitch compatible accessories.

U.S. Pat. No. 8,366,373 (Wood, 2013) discloses a collapsible mount that may be optionally attached to a trailer hitch and that is used to support a cargo-loading device such as a winch. The invention comprises horizontal and vertical arms that are adjustable in length. There is no provision for multiple receivers or for attaching other trailer hitch-compatible accessories.

U.S. Patent Application Pub. No. 2004/00200955 (Darby) is an adapter mechanism that allows the saddle of a kayak to be attached to the vertical bar of a commercial carrier device. This invention is slidably attached to the vertical square post of a commercial cargo carrier (such as the EXTEND-A-TRUCK II™ device manufactured by Darby Industries of Falls, Pa.) that is attached to the trailer hitch of a vehicle. The purpose of the invention is to provide a secure attachment of a round tube or rectangular bar comprising the saddle of a kayak to the vertical bar of the cargo carrier. There is no provision for multiple receivers or for attaching other trailer hitch-compatible accessories.

An example of a non-patented commercially available hitch receiver is the ULTRA-TOW™ dual hitch extension (Item No. 32799-1551) sold by Northern Tool+Equipment of Burnsville, Minn. This device attaches to the trailer hitch receiver of a vehicle and provides for the attachment of two trailer hitch-mountable accessories. The receivers of this device are stacked vertically and oriented longitudinally. Unlike the present invention, there is no provision for providing vertically oriented receivers, for having transversely-oriented receivers, or for attaching additional receivers with extension members.

BRIEF SUMMARY OF THE INVENTION

The present invention is a four-part trailer hitch attachment system for attachment to a vehicle having a long axis, the trailer hitch attachment system comprising: a bottom component comprising a horizontal leg oriented parallel to the long axis of the vehicle and further comprising a vertical leg that is welded to a top side of the horizontal leg, the horizontal leg having a proximal end and a distal end, the proximal end of the horizontal leg being square in cross section and configured to insert slidably into a square opening of a trailer hitch receiver of the vehicle, the distal end of the horizontal leg being square in cross section and forming a rearward-facing, horizontally oriented trailer hitch receiver, the vertical leg being square in cross section and positioned proximate to the distal end of the horizontal leg and forming an upward-facing, vertically oriented trailer hitch receiver, a four-leg intermediate component comprising a first vertical leg, a transversely oriented horizontal leg with a right end and a left end, a longitudinally oriented horizontal leg with a proximal end and a distal end, and a second vertical leg, the top end of the first vertical leg being welded to a bottom side of the longitudinally oriented horizontal leg proximate to the distal end of the longitudinally oriented horizontal leg, the bottom end of the second vertical leg being welded to a top side of the longitudinally oriented horizontal leg proximate to the distal end of the longitudinally oriented horizontal leg, the transversely oriented horizontal leg being positioned so that the right and left ends of the transversely oriented horizontal leg extend an equal distance horizontally from the first vertical leg, the transversely oriented horizontal leg being positioned adjacent to a corner formed by the bottom side of the longitudinally oriented horizontal leg and a front side of the first vertical leg, a top side of the transversely oriented horizontal leg being welded to the bottom side of the longitudinally oriented horizontal leg, and a rear side of the transversely oriented horizontal leg being welded to a front side of the first vertical leg, wherein the first vertical leg, the second vertical leg, the left end of the transversely oriented horizontal leg, the right end of the transversely oriented horizontal leg, and the distal end of the longitudinally oriented horizontal leg each is square in cross section and forms a trailer hitch receiver; a three-leg intermediate component comprising a first vertical leg, a horizontal leg, and a second vertical leg, the horizontal leg having a long axis and being welded between the first and second vertical legs with the long axis of the horizontal leg parallel to the long axis of the vehicle, the first vertical leg forming a downward-facing trailer hitch receiver, the second vertical leg forming an upward-facing trailer hitch receiver, the first vertical leg, the horizontal leg and the second vertical leg all being square in cross section; and a top component comprising a horizontal leg and a vertical leg, the horizontal leg having a proximal end and a distal end, each of the proximal end and the distal end forming a trailer hitch receiver, the top end of the vertical leg being welded to a lower side of the proximal end of the horizontal leg, the bottom end of the vertical leg forming a downward-facing trailer hitch receiver, a front side of the vertical leg being positioned flush with the proximal end of the horizontal leg.

In a preferred embodiment, the invention further comprises one or more strap attachment rings attached to at least one of the bottom component, the four-leg intermediate component, the three-leg intermediate component, and the top component, each strap attachment ring comprising a long axis, the long axis of the strap attachment ring being mounted transversely to a long axis of the horizontal leg. Preferably, the invention further comprises one or more steel collars welded to an outside end of at least one of the trailer hitch receivers.

BRIEF DESCRIPTION OF THE DRAWINGS

FIG. 6 is a left side view of the first assembly configuration shown in FIG. 5, shown with the components assembled.

FIG. 7 is a left side view of a second assembly configuration, which utilizes the bottom component, the four-leg intermediate component and the top component.

FIG. 8 is a left side view of the four-component system shown in FIG. 6, shown with four separate trailer hitch-mountable devices connected to the system and the system attached to a motor home.

FIG. 9 is a rear view of the four-leg intermediate component 11, shown with steps attached.

FIG. 12 is a left side view of the third assembly configuration shown attached to a pickup truck and connected to a ball-hitch mountable trailer, a cargo carrier, and a bicycle carrier.

REFERENCE NUMBERS

Figure 1:
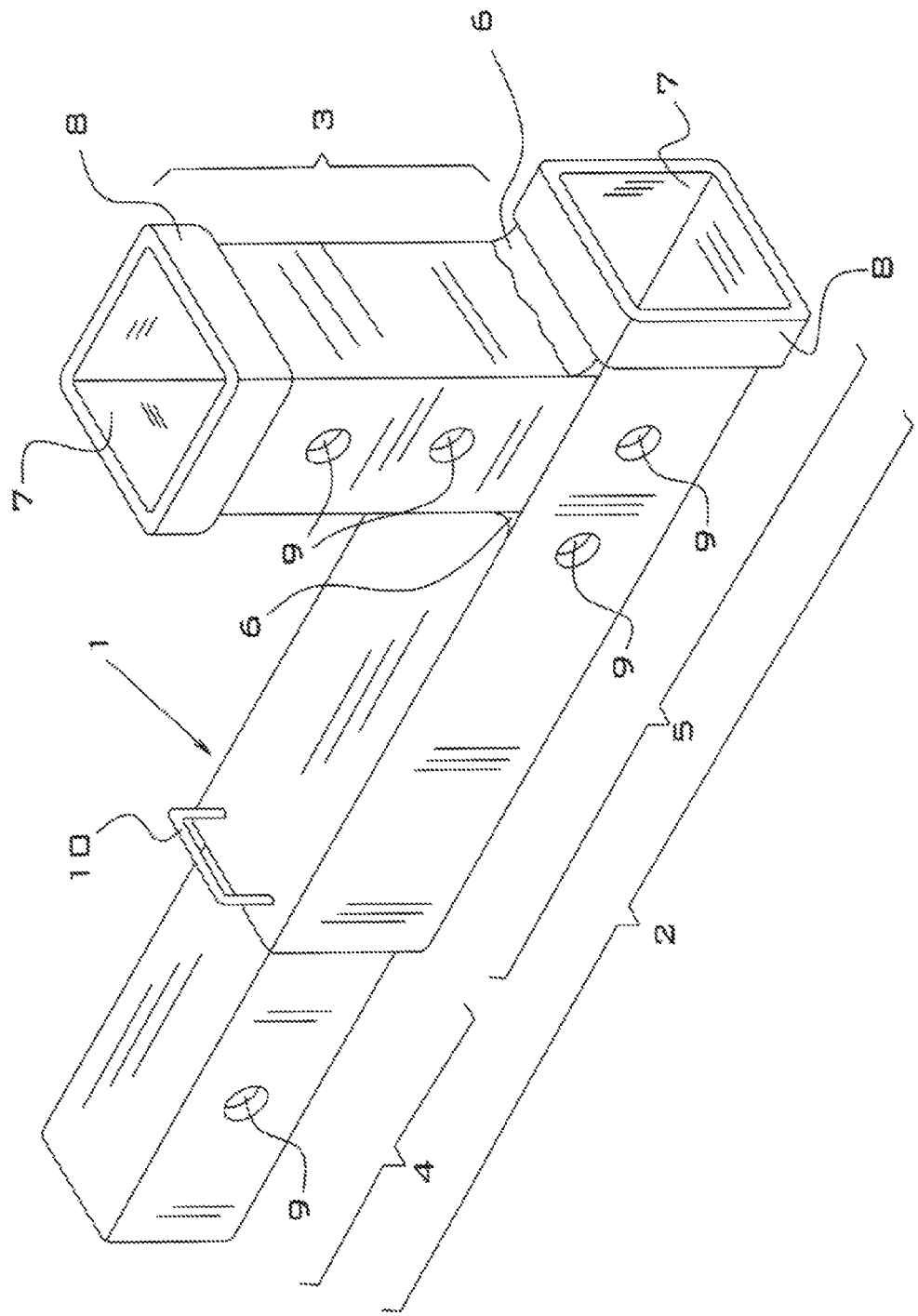
FIG. 1 is an isometric view of the bottom component of the present invention.

1 Bottom component
2 Horizontal leg of the bottom component
3 Vertical leg of the bottom component
4 Proximal portion of the horizontal leg of the bottom component
5 Distal portion of the horizontal leg of the bottom component
6 Welds
7 Inside walls of a trailer hitch receiver
8 Reinforcing collar
9 Hole for lock pins
10 Strap attachment ring
11 Four-leg intermediate component
12 Lower vertical leg of the four-leg intermediate component
13 Transverse horizontal leg of the four-leg intermediate component
14 Longitudinal leg of the four-leg intermediate component
15 Upper vertical leg of the four-leg intermediate component
16 Three-leg intermediate component
17 Lower vertical leg of the three-leg intermediate component
18 Horizontal leg of the three-leg intermediate component
19 Upper vertical leg of the three-leg intermediate component
20 Top component
21 Horizontal leg of the top component
22 Vertical leg of the top component
23 First extension member
24 Second extension member
25 Third extension member
26 Lock pin
27 Retaining clip for lock pin
28 Motor home
29 First cargo carrier
30 Second cargo carrier
31 Third cargo carrier
32 Bicycle carrier
33 Left step
34 Left support strap
35 Left safety chain attachment ring of the vehicle trailer hitch receiver
36 Vehicle trailer hitch receiver
37 First storage container, first assembly configuration
38 Tie-down strap
39 Food cooler
40 Second storage container
41 Bicycle
42 Left side of the transverse horizontal leg of the four-leg intermediate component
43 Right step 44 Right side of the transverse horizontal leg of the four-leg intermediate component
45 Distal end of the longitudinal horizontal leg of the four-leg intermediate component
46 Pickup truck
47 First storage container, second assembly configuration
48 Vehicle tail light
49 Elongated bottom component
50 Ball hitch
51 Trailer
52 Cargo carrier, third assembly configuration

DETAILED DESCRIPTION OF INVENTION

The present invention is a system comprising multiple trailer hitch receivers that may be connected to the single trailer hitch receiver of a vehicle and assembled in a variety of configurations. The multiple trailer hitch receivers of the present invention allow for the simultaneous attachment of multiple trailer hitch-mountable devices such as cargo carriers and bicycle racks. The attached devices can be installed in horizontal rows and/or in vertical columns. The present invention is designed to be compatible with a wide variety of commercially available hitch-mountable devices. The maximum total weight (including cargo) of the present invention is limited by the weight rating of the vehicle's trailer hitch receiver; for example, a Class III hitch has a maximum allowable weight of 600 pounds.

The present invention comprises four discrete components that may be connected in a variety of configurations that utilize two, three or four of the components. The system's components are interconnected with square tubular extension members that slidably attach to receivers in each of the components and that are held in place with lock pins that are inserted into holes that pass through two opposing sides of the components and matching holes in two opposing sides of the extension members. The components and extension members are designed so that either one or two lock pins may be used on each connection, depending on the preference of the user. Two lock pins provide a connection having less wobble between a component and the connecting extension member compared to a single lock-pin connection, whereas a single lock-pin connection is faster to assemble than a two lock-pin connection.

The four system components include a bottom component, a four-leg intermediate component, a three-leg intermediate component, and a top component. In a preferred embodiment, the parts are constructed from powder-coated square steel tubing and are sized to be compatible with standard two-inch trailer hitch receiver components. In the following descriptions, the term "proximal" refers to the portion nearest to the vehicle, "distal" refers to the portion farthest from the vehicle, "left side" is the side on the left when viewed facing the rear of the vehicle, and "right side" is the side on the right when viewed facing the rear of the vehicle.

The bottom component comprises a single horizontal leg oriented parallel to the long (or longitudinal) axis of the vehicle and a single vertical leg that is welded to the top side of the horizontal leg. The proximal portion of the horizontal leg slidably inserts into the square opening of a vehicle's trailer hitch receiver and is held in place by a lock pin that passes through horizontal holes in the two sides of the trailer hitch receiver and two matching holes near the proximal end of the inserted horizontal leg. The distal end of the horizontal leg forms a rearward-facing, horizontally oriented trailer hitch receiver. Two horizontal transverse holes that accept lock pins are located in both the left side and the right side of the horizontal leg near the distal end. The vertical leg of the bottom component is positioned near the distal end of the horizontal leg and forms an upward-facing, vertically oriented trailer hitch receiver. Two horizontal transverse holes that accept lock pins are located in both the left side and the right side of the vertical leg near the top end. The positions of the transverse lock-pin holes on both legs are set so as to mate with matching holes located in extension members or other receiver-mountable attachment devices that may be inserted into the trailer hitch receivers of the legs.

An optional strap attachment ring may be welded to the top surface of the horizontal leg. In a first preferred embodiment, the proximal end of the horizontal leg is square in cross section, with a length of approximately 5.5 inches and an outside width of 2.0 inches; the distal end of the horizontal member is square in cross section with a length of approximately 12 inches with an outside width of approximately 2.5 inches; the vertical leg is square in cross section with a length of approximately 6.0 inches and an outside width of approximately 2.5 inches; the locking-pin holes are all approximately 0.64 in diameter; the hole in the proximal end of the horizontal leg is approximately 2.5 inches from the proximal end; the holes in the distal end of the horizontal leg are approximately 2.5 and 4.5 inches from the distal end; and the holes in the vertical arm are approximately 2.3 and 4.3 inches from the top end. The optional strap attachment ring is preferably oval in shape, with an inside width of approximately 2.0 inches, an inside height of approximately 0.8 inch, and a thickness of approximately 0.3 inch, with the long axis of the strap attachment ring mounted transversely to the long axis of the horizontal leg. The rear edge of the strap attachment ring is preferably positioned approximately 10.0 inches from the distal end of the horizontal leg, a The four-leg intermediate component comprises a lower vertical leg, u transversely oriented horizontal leg (that is, a transverse horizontal leg having its long axis perpendicular to the long axis of the vehicle), a longitudinally oriented horizontal leg (that is, a longitudinal horizontal leg having its long axis parallel with the long axis of the vehicle), and an upper vertical leg. The top end of the lower vertical leg is welded to the bottom side of the longitudinal horizontal leg near the distal end, and the bottom end of the upper vertical leg is welded to the top side of the longitudinal horizontal leg near the distal end. The transverse horizontal leg is welded to both the lower vertical leg and the longitudinal horizontal leg and positioned so that the right and left ends of the transverse horizontal leg extend an equal distance horizontally from the two vertical legs. The transverse horizontal leg is positioned adjacent to the corner formed by the bottom side of the longitudinal horizontal leg and the front side of the lower vertical leg, with the top side of the transverse horizontal leg welded to the bottom side of the longitudinal horizontal leg and the rear side of the transverse horizontal leg welded to the front side of the lower vertical leg. The upper vertical leg, the lower vertical leg, the left and right ends of the transverse horizontal leg and the distal end of the longitudinal horizontal leg form trailer hitch receivers. Two lock-pin holes are positioned on the left and right sides of the upper and lower vertical legs and the longitudinal horizontal leg, and two lock-pin holes are installed on the front side and rear side near each end of the transverse horizontal leg. A pair of strap attachment rings (shown in FIG. 9) may be optionally installed on the lower side of the transverse horizontal leg.

In a preferred embodiment, all of the legs are square in cross section and have an outside width of approximately 2.5 inches; the two vertical legs are each approximately 6.0 inches in length; the transverse leg has a length of approximately 14.6 inches; the longitudinal leg has a length of approximately 6.0 inches; the lock-pin holes are all approximately 0.64 in diameter; the holes in the lower and upper legs are located approximately 1.8 and 3.8 inches from the bottom and top end, respectively; the holes in the transverse horizontal member are located approximately 1.5 and 3.5 inches from each end; the holes in the longitudinal horizontal member are located approximately 2.5 and 4.5 inches from the distal end; and the rear sides of the two vertical legs are positioned approximately 1.3 inches from the distal end of the longitudinal horizontal leg. The optional strap attachment rings are generally rectangular in shape with rounded corners, have an inside width of approximately 2.0 inches, an inside height of approximately 0.8 inches and a thickness of approximately 0.4 inches. The outside edge of each strap attachment ring is positioned approximately 0.7 inch from the nearest edge of the transverse horizontal leg.

The three-leg intermediate component comprises a lower vertical leg, a horizontal leg, and an upper vertical leg. The horizontal leg is welded between the upper and lower vertical legs, with its long axis parallel with the long axis of the vehicle. The lower vertical leg forms a downward-facing trailer hitch receiver. The upper vertical leg forms an upward-facing trailer hitch receiver. The distal end of the horizontal leg forms a rearward-facing horizontal trailer hitch receiver. Each of the three legs comprises two transverse holes in both the left side and the right side that accept lock pins. The positions of the transverse lock-pin holes on all three legs are set so as to mate with matching holes located in extension members or attachment devices that may be inserted into the trailer hitch receivers of the legs. An optional strap attachment ring may be welded to the front face of each of the vertical legs.

In a preferred embodiment, all of the legs are square in cross section with an outside width of approximately 2.5 inches; the length of the vertical legs is approximately 5.8 inches each; the length of the horizontal leg is approximately 8.0 inches; the rear edge of each vertical leg is located approximately 1.0 inch from the distal end of the horizontal member; the lock-pin holes are all approximately 0.64 in diameter; the holes in the horizontal leg are located approximately 2.0 and 4.0 inches from the distal end; and the holes in the lower and upper vertical legs are located approximately 1.8 and 3.8 inches from the lower and upper ends, respectively. The optional strap attachment rings are generally rectangular in shape with rounded corners, have an inside width of approximately 2.0 inches, an inside height of approximately 0.8 inches and a thickness of approximately 0.4 inches. The bottom edge of the lower strap attachment ring is positioned approximately 0.7 inch in from the bottom edge of the lower vertical leg, and the top edge of the upper strap attachment ring is positioned approximately 0.7 inch in from the top edge of the upper vertical leg.

The top component comprises a single horizontal leg and a single vertical leg. The horizontal leg is open and forms a trailer hitch receiver at each end so that an attachment device may be slidably attached to either the proximal end or the distal end of the horizontal member. The top end of the vertical leg is welded to the lower side of the proximal end of the horizontal leg. The bottom end of the vertical leg forms a downward-facing vertical trailer hitch receiver. Both legs comprise two transverse locking-pin holes in both the left side and right side. In a preferred embodiment, both legs have an outside width of approximately 2.5 inches and a length of approximately 5.8 inches; the lock-pin holes are all approximately 0.64 in diameter; the holes in the vertical leg are located approximately 1.8 and 3.8 inches from the bottom end of the vertical leg; the holes in the horizontal leg are located approximately 1.8 and 3.8 inches from the distal end; and the front side of the vertical leg is positioned flush with the proximal end of the horizontal leg.

In a preferred embodiment, the extension members are manufactured from two-inch square steel tubing that is either powder coated or galvanized. The extension members have 0.64-inch diameter lock-pin holes on two opposing sides, with the holes installed at two-inch spacings on-center along the length of each extension member.

In a preferred embodiment, the wall thickness of all of the components and extension members is approximately 0.25 inch. Some or all of the hitch receivers on each of the four components may be optionally reinforced by the installation of a steel collar welded around the outside end of the receiver. The purpose of the collars is to reinforce the receivers, thereby providing additional strength and rigidity. In a preferred embodiment, the optional square collars extend from the end of the receivers to a distance approximately 0.8 inch back from the ends, and the outside width of the receiver with collar is approximately 3.0 inches.

FIG. 1 is an isometric view of the bottom component 1. As shown, the bottom component 1 is comprised of a horizontal leg 2 and a vertical leg 3, both of which are manufactured from square steel tubing. The horizontal leg 2 has a proximal section 4 and a distal section 5. The side width of the proximal section 4 is smaller than the side width of the distal section 5 and is sized so as to be slidably insertable into the trailer hitch receiver (shown in FIGS. 8 and 10) of a vehicle. The proximal section 4 is attached to the distal section 5 and the vertical leg 3 is attached to the distal section 5 of the horizontal leg 2 by welding. The welds 6 that attach the vertical leg 3 to the horizontal leg 2 are shown. The vertical leg 3 and the distal section of the horizontal leg 2 form standard two-inch trailer hitch receivers, wherein the inside walls 7 of the trailer hitch receivers are manufactured so as to accept insertable two-inch trailer hitch components. The two trailer hitch receivers are shown with optional reinforcing collars 8. Transverse lock-pin holes 9 are installed through the left and right sides of the horizontal leg 2 and the vertical leg 3 as shown. An optional strap attachment ring 10 may be welded to the top surface of the horizontal leg 2 as shown.

Figure 2:
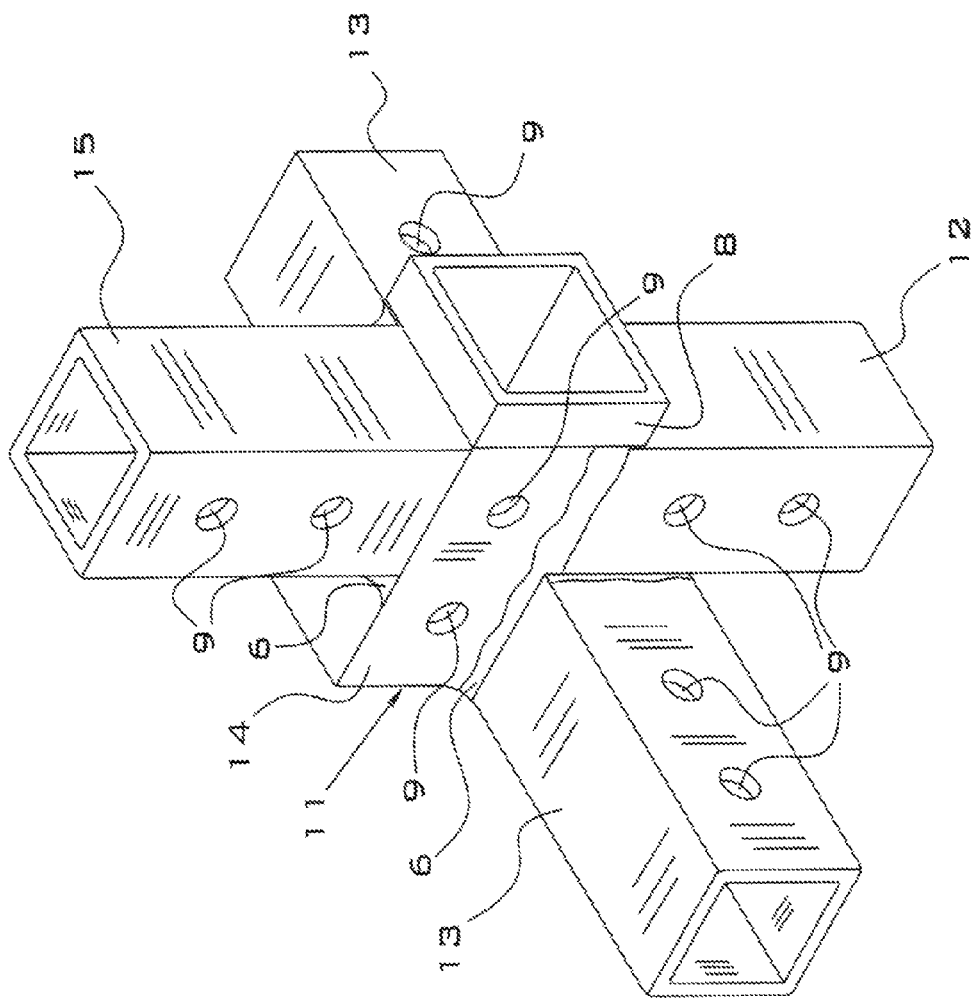
FIG. 2 is an isometric view of the four-leg intermediate component of the present invention.

FIG. 2 is an isometric view of the four-leg intermediate component 11. As shown, this component comprises a lower vertical leg 12 with one terminal end, a transverse horizontal leg 13 with two terminal ends, a longitudinal horizontal leg 14 with two terminal ends, and an upper vertical leg 15 with one terminal end. Lock-pin holes 9 are provided in each leg as shown. The legs 12, 13, and 15 each forms a two-inch trailer hitch receiver, and the leg 14 forms a two-inch trailer hitch receiver on the left side and a two-inch trailer hitch receiver the right side. The distal end of the longitudinal horizontal leg 14 is shown with an optional reinforcing collar 8. The legs 12, 13, 14 and 15 are welded together with welds 6. Two strap attachment rings 10 (shown in FIG. 6) are welded to the lower surface of the transverse horizontal leg 14.

Figure 3:
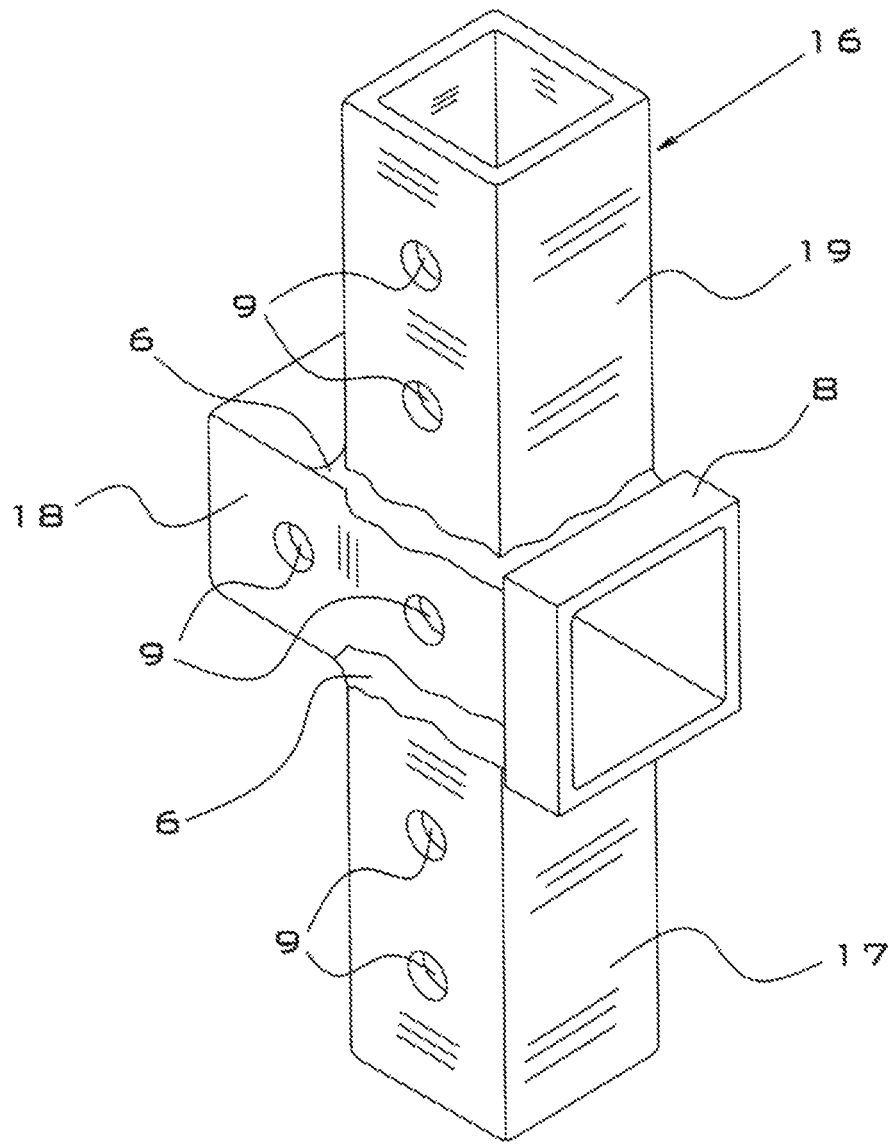
FIG. 3 is an isometric view of the three-leg intermediate component of the present invention.

FIG. 3 is an isometric view of the three-leg intermediate component 16. As shown, this component comprises a lower vertical leg 17, a horizontal leg 18 and an upper vertical leg 19. Lock-pin holes 9 are installed in each leg as shown. The legs 17, 18, and 19 each form a two-inch trailer hitch receiver, with an optional reinforcing collar 8 shown around the distal end of the horizontal leg 18. The three legs 17, 18, 19 are attached with welds 6.

Figure 4:
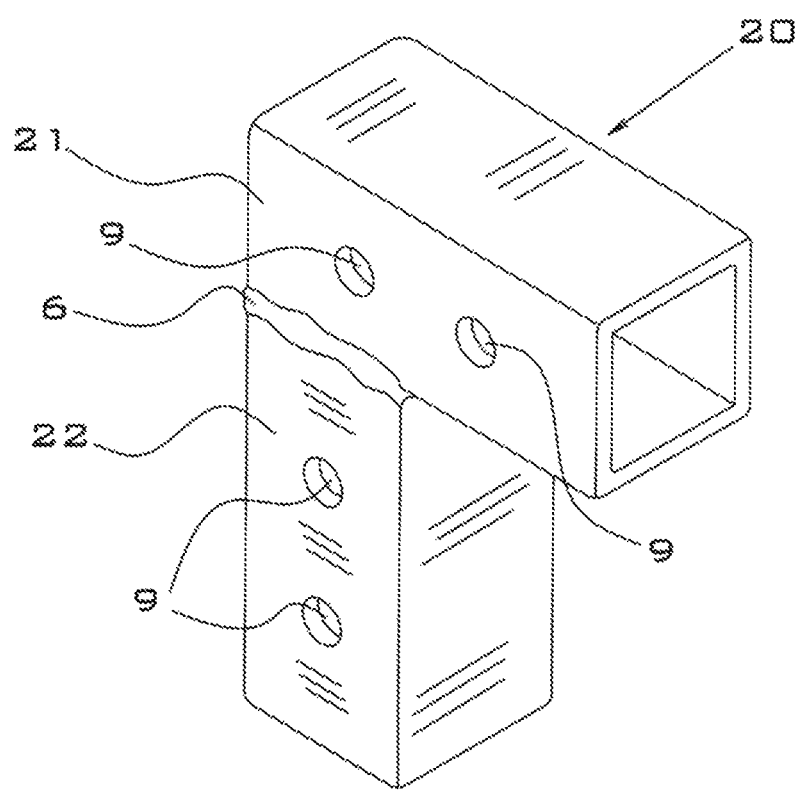
FIG. 4 is an isometric view of the top component of the present invention.

FIG. 4 is an isometric view of the top component 20, which comprises a horizontal leg 21 and vertical leg 22. The horizontal leg 21 and the vertical leg 22 each forms a two-inch trailer hitch receiver, shown in this drawing without optional reinforcing collars. Lock-pin holes 9 are provided in each leg as shown.

Figure 5:
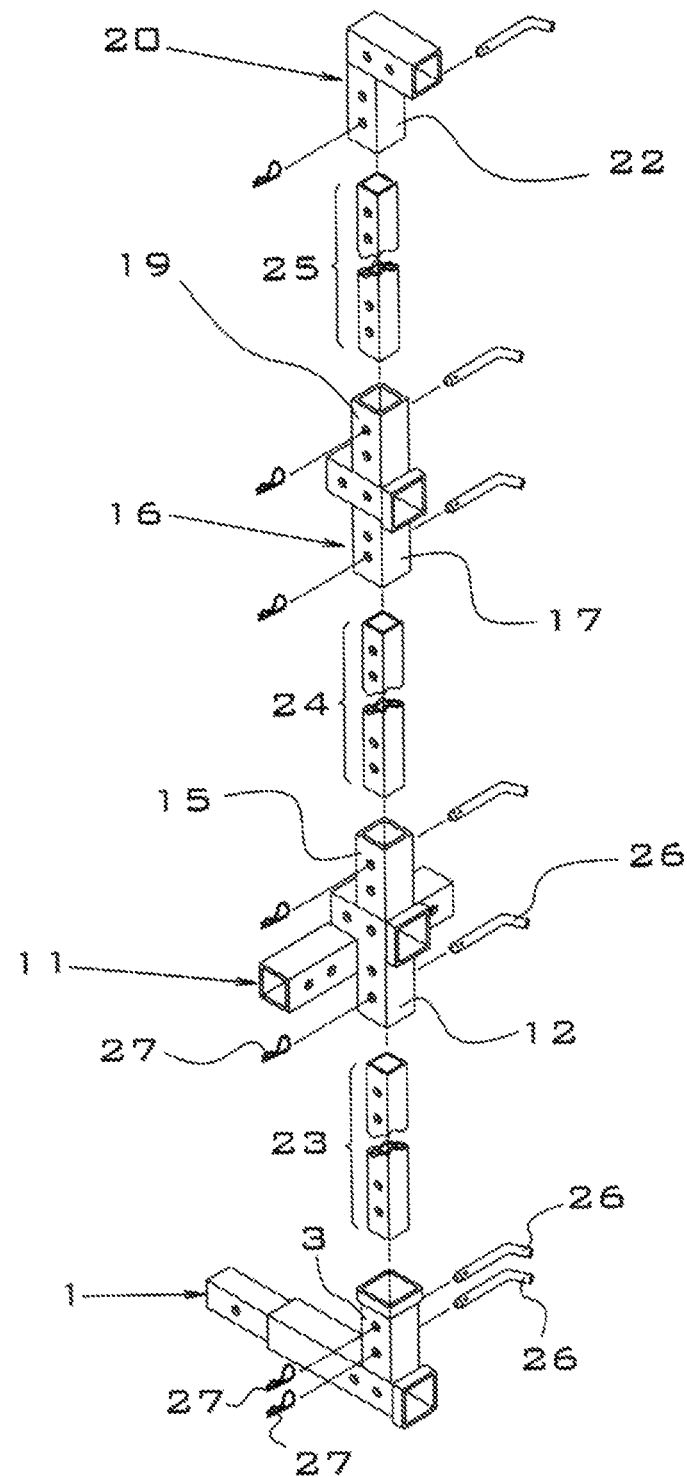
FIG. 5 is an exploded isometric view of a first assembly configuration of the present invention that incorporates all four of the components.

The welds that are shown in FIGS. 1 through 4 have been removed for clarity in the following FIGS. 5 through 12. FIG. 5 is an exploded isometric view of a first assembly configuration of the present invention that incorporates all four of the components. As shown, a first extension member 23 is used to connect the bottom component 1 to the four-leg intermediate component 11 by inserting the lower end of the extension member 23 into the vertical leg 3 of the bottom component 1 and inserting the upper end of the first extension member 23 into the lower vertical leg 12 of the four-leg intermediate component 11. Similarly, a second extension member 24 is used to connect the upper vertical leg 15 of the four-leg intermediate component 11 to the lower vertical leg 17 of the three-leg intermediate component 16, and a third extension member 25 is used to connect the upper vertical leg 19 of the three-leg intermediate component 16 to the vertical leg 22 of the top component 20. The length of the extension members 23, 24 and 25 may be selected as required in order to provide proper spacing for external components such as cargo carriers and bicycle racks. For example, extension members 23, 24, and 25 may be one, two, three or four feet in length. The extension members 23, 24 and 25 may be the same or different lengths for a particular assembly configuration.

Standard trailer hitch lock pins 26 are used to secure each of the extension members to its adjoining components, and each of the lock pins 26 is held in place by a retaining clip 27. As shown in FIG. 5, two lock pins 26 are used to secure the first extension member 23 to the bottom component 1, and a single lock pin 26 is used to secure the first extension member 23 to the four-leg intermediate component 11, thereby illustrating that a user may utilize either one or two lock pins 26 as desired to make any of the connections between an extension member and an adjoining component.

FIG. 6 is a left side view of the first assembly configuration shown in FIG. 5, shown with the components assembled. The bottom component 1 is connected to the four-leg intermediate component 11 by the first extension member 23, the four-leg intermediate component 11 is connected to the three-leg intermediate component 16 by the second extension member 24, and the three-leg intermediate component 16 is connected to the top component 20 by the third extension member 25. In this illustration, one-foot lengths have been selected for each of the extension members 23, 24 and 25. Optional strap attachment rings 10 are shown attached to the bottom component 1, the four-leg intermediate component 11, and the three-leg intermediate component 16. The assembly shown in FIG. 6 may be modified to provide extra vertical room for cargo carriers by using extension members longer than one foot. For example, when this system is attached to a motor home having a vertical height taller than a passenger vehicle, the lengths of the first, second, and third extension members 23, 24 and 25 may be selected to be two feet, two feet, and one foot, respectively, as illustrated in FIG. 8.

FIG. 7 is a left side view of a second assembly configuration, which utilizes the bottom component 1, the four-leg intermediate component 11 and the top component 20, but does not include the three-leg component 16 shown in FIG. 6. As shown, the bottom component 1 is attached to the four-leg intermediate component 11 by a first extension member 23, and the four-leg component 11 is attached to the top component 20 by a second extension member 24. In this configuration, a two-foot length has been selected for first extension member 23, and a one-foot length has been selected for second extension member 24.

FIG. 8 is a left side view of the four-component system shown in FIG. 6, shown with four separate trailer hitch-mountable devices connected to the system and with the system attached to a motor home 28. In this assembly configuration, a first cargo carrier 29 is connected to the horizontal trailer hitch receiver of the bottom component 1, a second cargo carrier 30 is connected to the longitudinal trailer hitch receiver of the four-leg intermediate component 11, a third cargo carrier 31 is connected to the horizontal trail hitch receiver of the three-leg intermediate component 16, and a bicycle carrier 32 is connected to the trailer hitch receiver of the top component 20. A left step 33 is connected to the left transverse trailer hitch receiver of the four-leg component 11, and an identical right step is attached to the right transverse trailer hitch receiver of the four-leg intermediate component 11, as shown in FIG. 9. The purpose of the steps is to allow easy access to the top of the bicycle carrier 32 in order to install or remove bicycles. Also shown is a left support strap 34 that is connected between the left safety chain attachment ring 35 of the vehicle trailer hitch receiver 36 and the left strap attachment ring 10 of the four-leg intermediate component 11. An identical right support strap (not shown) is connected between the right safety chain attachment ring of the vehicle trailer hitch receiver and the right strap attachment ring of the four-leg intermediate component. The support straps are preferably standard, ratchet-tightening polymer straps.

The first cargo carrier 29 is shown carrying a first storage container 37 that is removably attached to the first cargo carrier 29 with a tie-down strap 38. Optionally, the first cargo carrier may comprise loading ramps for loading a lawnmower or other wheeled equipment (not shown). The second cargo carrier 30 is shown carrying a food cooler 39 that is removably attached to the second cargo carrier 30 with a tie-down strap 38. The third cargo carrier 31 is shown carrying a second storage container 40 that is removably attached to the third cargo carrier 31 with a tie-down strap 38. The bicycle carrier 32 is shown carrying two bicycles 41 with the bicycle seats and handlebars removed for transport. The cargo carriers, bicycle carrier, and steps are commercial items that are available from numerous sources. An example of a suitable first cargo carrier is the PRO SERIES™ hitch-mounted cargo carrier manufactured by Cequent Performance Products, Inc. of Plymouth, Mich. An example of a suitable second cargo carrier is the CURT™ cargo carrier manufactured by CURT Manufacturing LLC of Eau Claire, Wis. An example of a suitable third cargo carrier is the MAXXTOW™ cargo carrier manufactured by Maxtow Products of Camarillo, Calif. An example of a suitable bicycle carrier is the SWAGMAN 2™ bike rack manufactured by Swagman Racks of Penticton, British Columbia, Canada. An example of suitable steps is the REESE™ hitch step manufactured by Reece Hitches of Burnsville, Minn.

FIG. 9 is a rear view of the four-leg intermediate component 11, shown with steps attached. As shown, a left step 33 is slidably and removably attached into the two-inch trailer hitch receiver that forms the left side 42 of the transverse horizontal leg 13, and a right step 43 is similarly attached into the right side 44 of the transverse horizontal leg 13. The steps are held in place by lock pins that are secured by retaining clips 27. Also shown is a strap attachment ring 10 on the bottom side of each of the left and right sides 42, 44 of the transverse horizontal leg 13, the distal end 45 of the longitudinal horizontal leg, the lower vertical leg 12 and the upper vertical leg 15.

Figure 10:
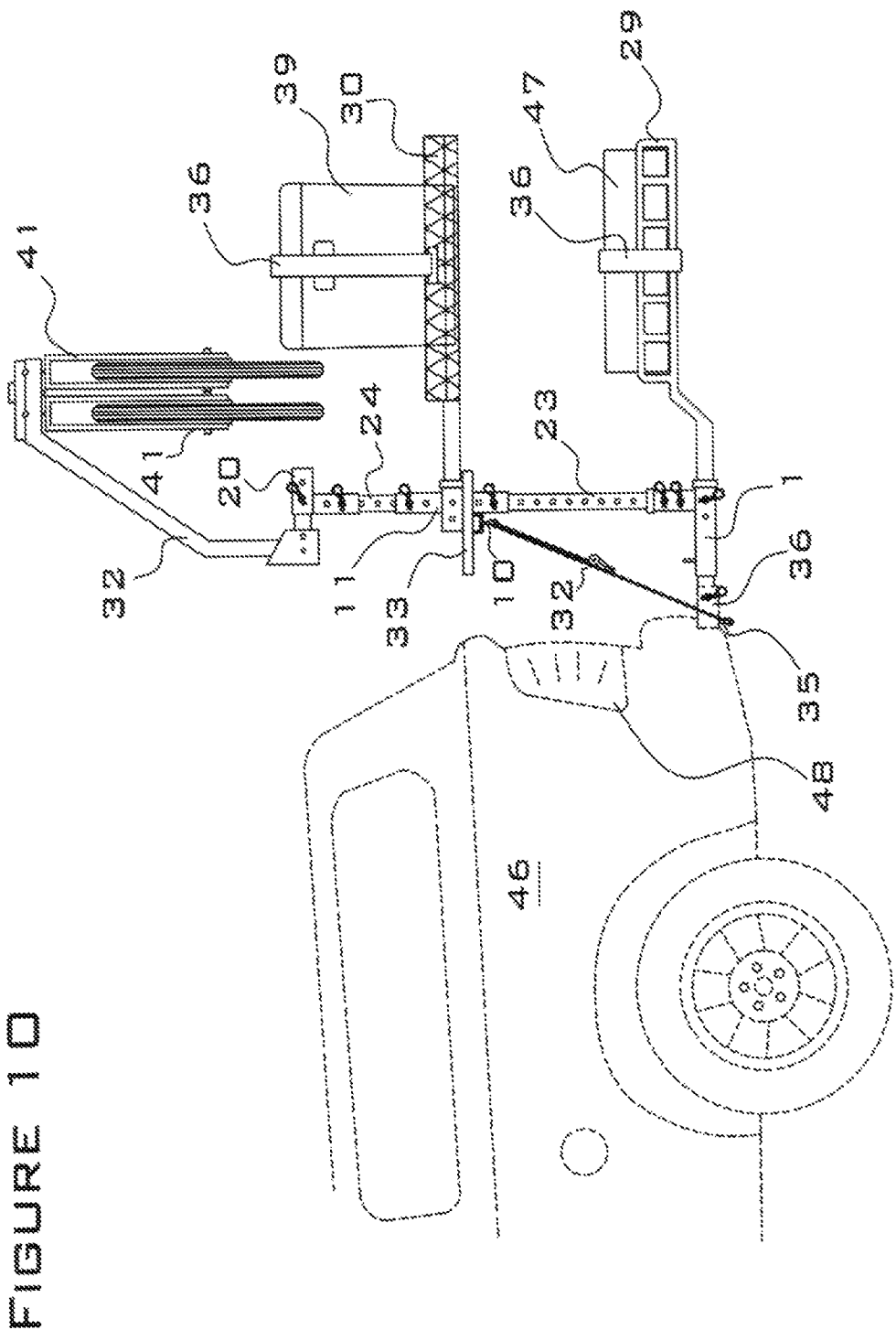
FIG. 10 is a left side view of the three-component assembly shown in FIG. 7, which is the second assembly configuration, shown with three separate trailer hitch-mountable devices connected to the system and the system connected to a pickup truck.

FIG. 10 is a left side view of the three-component assembly shown in FIG. 7, which is the second assembly configuration, shown with three separate trailer hitch-mountable devices connected to the system and the system connected to a pickup truck 46. In this assembly example, a first cargo carrier 29 is connected to the horizontal trailer hitch receiver of the bottom component 1, a second cargo carrier 30 is connected to the longitudinal trailer hitch receiver of the four-leg intermediate component 11, and a bicycle carrier 32 is connected to the trailer hitch receiver of the top component 20. A first storage container 47 is carried in the first cargo carrier 29, a food cooler 39 is carried in the second cargo carrier 30, and two bicycles 41 (with seats and handlebars removed for transport) are carried in the bicycle carrier 32. A left step 33 is attached to the left transverse trailer hitch receiver of the four-leg intermediate component 11, and an identical right step is attached to the right transverse trailer hitch receiver of the four-leg intermediate component 11, as shown in FIG. 9. With the assembly configuration shown in FIG. 10, the length of the first extension member 23 is selected so that the vehicle's tail lights 48 are visible to the drivers of following vehicles. For other assembly configurations that may obscure the tail light visibility, commercially available clamp-on or magnetically attached tail lights (not shown) may be temporarily installed on the cargo carriers.

Figure 11:
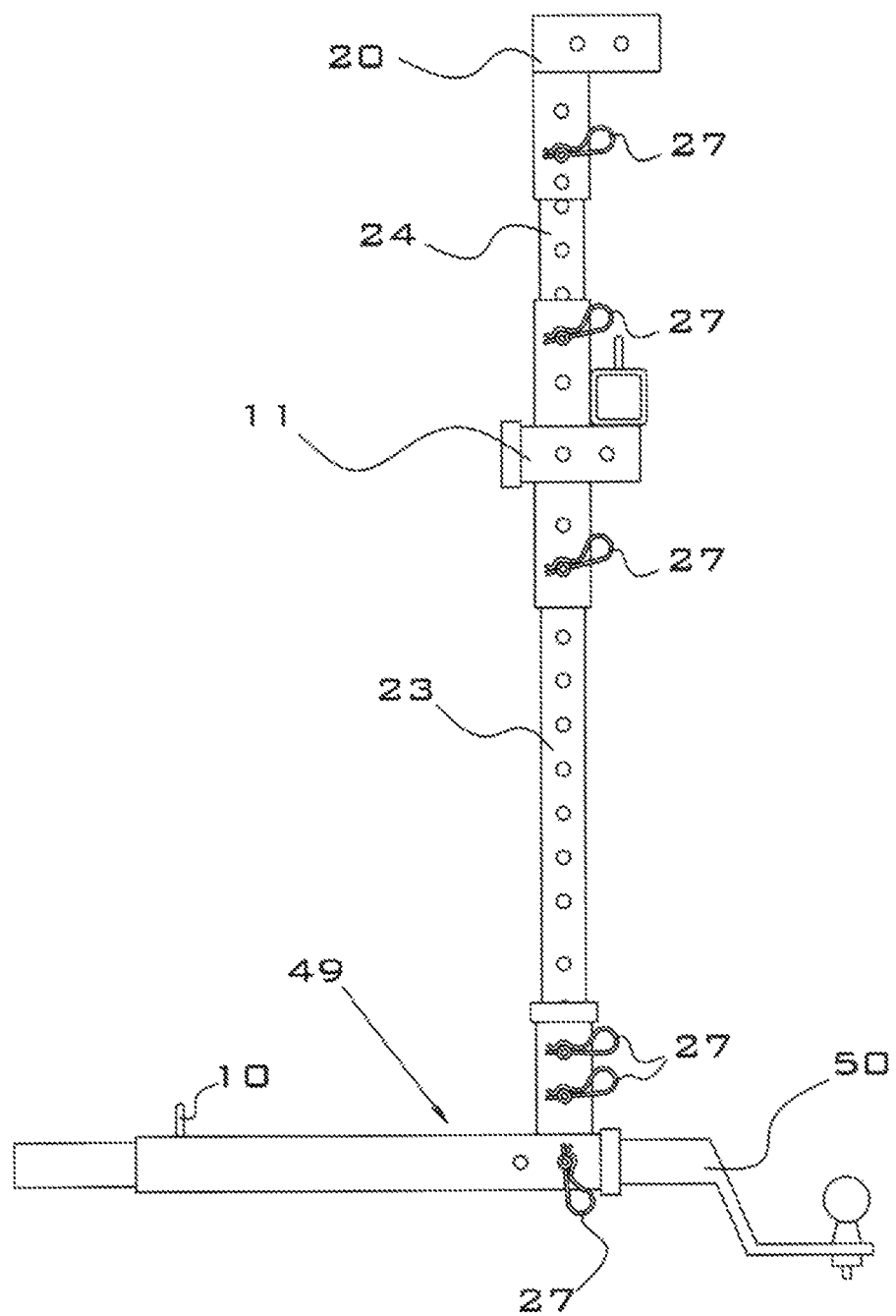
FIG. 11 is a left side view of a third assembly configuration that utilizes a second preferred embodiment of the bottom component.

FIGS. 11 and 12 are left side views of a third assembly configuration that utilizes a second preferred embodiment of the bottom component. The second preferred embodiment of the bottom component is an elongated bottom component 49 having a longer horizontal leg than the horizontal leg of the bottom component 1 of the first preferred embodiment. FIG. 11 shows the third assembly configuration, comprised of an elongated bottom component 49, a first extension member 23, a four-leg intermediate component 11, a second extension member 24 and a top component 20. The assembly is shown with a ball hitch 50 attached to the horizontal trailer hitch receiver of the elongated bottom component 49. The second preferred bottom component 49 is advantageous over the first preferred standard bottom component 1 in certain assembly configurations, and particularly for applications where the attaching vehicle comprises a tail gate that swings downward (such as a pickup truck) or a rear hatch that swings upward (such as on some sport-utility vehicles). For these types of vehicles, the elongated bottom component allows sufficient clearance for the opening and closing of the tail gate or rear hatch without removing the multiple receiver attachment system.

FIG. 11 also shows the four-leg intermediate component 11 oriented upside-down and front-to-back as compared to the orientation of this component shown in FIGS. 2, 5, 6, 7, 8, 9 and 10. The ability of the four-leg intermediate component to be installed in different orientations provides additional assembly configurations for the system, as shown in FIG. 12. The three-leg intermediate component 16 shown in FIGS. 3, 5, 6 and 8 may also be installed with orientations that are upside-down and/or front-to-back, compared to the orientation shown in these figures.

FIG. 12 shows the third assembly configuration attached to a pickup truck 46 and connected to a ball-hitch mountable trailer 51, a cargo carrier 52, and a bicycle carrier 32. The trailer 51 may be a utility trailer, a motorcycle trailer, or any other suitable towable trailer that does not exceed the rating of the vehicle trailer hitch receiver. With the four-leg intermediate component 11 installed with the trailer hitch receiver facing forward as shown, the cargo carrier 52 may be installed between the rear of the pickup 46 and the four-leg intermediate component 11 as shown. The length of the elongated bottom component 49 determines the allowable length of the cargo carrier 52; i.e., the longer length of the bottom component 49 of the second preferred embodiment allows for a longer cargo carrier to be utilized in this configuration, as compared to the length of the cargo carrier that would fit if the bottom component of the first preferred bottom component were used. In the second preferred embodiment, the elongated bottom component 49 comprises a horizontal leg having a length of approximately 30 inches, in contrast to the 17.5-inch length of the standard bottom component 1.

There are numerous other possible assembly configurations in addition to the ones described above that may be assembled using various combinations of the four components and various lengths of extension members. In addition to transporting cargo, the present invention may be configured so as to be useful for numerous purposes when the vehicle is parked. In one example, the system comprises a bottom component, a first extension member, and a top component. A crane mast with a hand-powered cable winch is attached to the trailer hitch receiver of the top component, and a cargo basket is attached to the trailer hitch receiver of the bottom component. With this configuration, a heavy object such as a deer carcass may be lifted into the air with the crane and then lowered into the cargo carrier for transport. In a second example, the system comprises a bottom component, a four-foot extension member, and a four-leg intermediate component. Instead of steps, the four-leg intermediate component is fitted with a four-foot left horizontal extension member and a four-foot right horizontal extension member, and these two horizontal extension members may be used to support a pair of swinging chairs.

The present invention may alternately be made in sizes other than two-inch. For example, the components of the present invention may be sized so as to be compatible with standard 1¼ inch trailer hitch receivers and accessories. The extension members may alternately be made in 0.125 inch thickness rather than 0.25. The hole-spacing of the extension members may alternately be four inches. The system alternately could be made with lighter-weight material, such as aluminum.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A four-part trailer hitch attachment system for attachment to a vehicle having a long axis, the trailer hitch attachment system comprising:
   (a) a bottom component comprising a horizontal leg oriented parallel to the long axis of the vehicle and further comprising a vertical leg that is welded to a top side of the horizontal leg, the horizontal leg having a proximal end and a distal end, the proximal end of the horizontal leg being square in cross section and configured to insert slidably into a square opening of a trailer hitch receiver of the vehicle, the distal end of the horizontal leg being square in cross section and forming a rearward-facing, horizontally oriented trailer hitch receiver, the vertical leg being square in cross section and positioned proximate to the distal end of the horizontal leg and forming an upward-facing, vertically oriented trailer hitch receiver;
   (b) a four-leg intermediate component comprising a first vertical leg, a transversely oriented horizontal leg with a right end and a left end, a longitudinally oriented horizontal leg with a proximal end and a distal end, and a second vertical leg, the top end of the first vertical leg being welded to a bottom side of the longitudinally oriented horizontal leg proximate to the distal end of the longitudinally oriented horizontal leg, the bottom end of the second vertical leg being welded to a top side of the longitudinally oriented horizontal leg proximate to the distal end of the longitudinally oriented horizontal leg, the transversely oriented horizontal leg being positioned so that the right and left ends of the transversely oriented horizontal leg extend an equal distance horizontally from the first vertical leg, the transversely oriented horizontal leg being positioned adjacent to a corner formed by the bottom side of the longitudinally oriented horizontal leg and a front side of the first vertical leg, a top side of the transversely oriented horizontal leg being welded to the bottom side of the longitudinally oriented horizontal leg, and a rear side of the transversely oriented horizontal leg being welded to a front side of the first vertical leg, wherein the first vertical leg, the second vertical leg, the left end of the transversely oriented horizontal leg, the right end of the transversely oriented horizontal leg, and the distal end of the longitudinally oriented horizontal leg each is square in cross section and forms a trailer hitch receiver;

(c) a three-leg intermediate component comprising a first vertical leg, a horizontal leg, and a second vertical leg, the horizontal leg having a long axis and being welded between the first and second vertical legs with the long axis of the horizontal leg parallel to the long axis of the vehicle, the first vertical leg forming a downward-facing trailer hitch receiver, the second vertical leg forming an upward-facing trailer hitch receiver, the first vertical leg, the horizontal leg and the second vertical leg all being square in cross section; and (d) a top component comprising a horizontal leg and a vertical leg, the horizontal leg having a proximal end and a distal end, each of the proximal end and the distal end forming a trailer hitch receiver, the top end of the vertical leg being welded to a lower side of the proximal end of the horizontal leg, the bottom end of the vertical leg forming a downward-facing trailer hitch receiver, a front side of the vertical leg being positioned flush with the proximal end of the horizontal leg.

2. The four-part trailer hitch attachment system of claim 1, further comprising one or more strap attachment rings attached to at least one of the bottom component, the four-leg intermediate component, the three-leg intermediate component, and the top component, each strap attachment ring comprising a long axis, the long axis of the strap attachment ring being mounted transversely to a long axis of the horizontal leg.

3. The four-part trailer hitch attachment system of claim 1, further comprising one or more steel collars welded to an outside end of at least one of the trailer hitch receivers.

* * * * *